(12) United States Patent
Huijsing

(10) Patent No.: US 12,044,412 B2
(45) Date of Patent: Jul. 23, 2024

(54) TEMPERATURE-CONTROLLED CONTAINER COMPRISING A UV LIGHT SOURCE

(71) Applicant: B/E Aerospace, Inc., Winston Salem, NC (US)

(72) Inventor: Hans Huijsing, Dorst (NL)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 18/507,822

(22) Filed: Nov. 13, 2023

(65) Prior Publication Data
US 2024/0183539 A1     Jun. 6, 2024

(30) Foreign Application Priority Data
Dec. 6, 2022    (EP) ..................... 22211817

(51) Int. Cl.
*F24C 15/00*     (2006.01)
*F24C 15/02*     (2006.01)
(Continued)

(52) U.S. Cl.
CPC .......... *F24C 15/008* (2013.01); *F24C 15/021* (2013.01); *F25D 23/028* (2013.01); *F25D 27/005* (2013.01); *F25D 2327/00* (2013.01)

(58) Field of Classification Search
CPC ...... F24C 15/008; F25D 27/00; F25D 27/005; F25D 2327/00; F24D 23/028
See application file for complete search history.

(56) References Cited

U.S. PATENT DOCUMENTS

2008/0295271 A1* 12/2008 Perunicic ............. A47L 11/405
                                                      15/246.3
2009/0223635 A1* 9/2009 Lawless ................ G01N 21/94
                                                    250/206

(Continued)

FOREIGN PATENT DOCUMENTS

DE          10128024     1/2003
EP           0968143      1/2001
(Continued)

OTHER PUBLICATIONS

EPO, European Extended Search Report dated Apr. 24, 2023 in EP Serial No. 22211817.6.

*Primary Examiner* — Erin Kryukova
(74) *Attorney, Agent, or Firm* — SNELL & WILMER L.L.P.

(57) ABSTRACT

A temperature-controlled container for preparation or storage of food products comprising: a temperature-controlled cavity for storing or preparing food products, a thermally insulated door configured to seal the temperature-controlled cavity in a closed configuration, and a UV light source mounted to the temperature-controlled container outside the temperature-controlled cavity and insulated from the temperature-controlled cavity by the thermally insulated door when in the closed configuration, wherein the UV light source is arranged to emit a UV light beam into the temperature-controlled cavity when the thermally insulated door is an open configuration. There is also provided an aircraft galley comprising one or more of said temperature-controlled containers.

11 Claims, 1 Drawing Sheet

(51) Int. Cl.
    *F25D 23/02*          (2006.01)
    *F25D 27/00*          (2006.01)

(56)            References Cited

U.S. PATENT DOCUMENTS

2021/0393824 A1     12/2021  Childress
2022/0096680 A1 *    3/2022  Mcintosh .................. A61L 2/28

FOREIGN PATENT DOCUMENTS

JP      2009019839          1/2009
JP      2009019839 A  *     1/2009
JP      2016125788 A  *     7/2016
WO      2005077556          8/2005
WO      2014102074          7/2014
WO      2021214574         10/2021

* cited by examiner

TEMPERATURE-CONTROLLED CONTAINER COMPRISING A UV LIGHT SOURCE

CROSS-REFERENCE TO RELATED APPLICATIONS

This application claims priority to, and the benefit of, EP Patent Application No. 22211817.6, filed Dec. 6, 2022 and titled "TEMPERATURE-CONTROLLED CONTAINER COMPRISING A UV LIGHT SOURCE," which is incorporated by reference herein in its entirety for all purposes.

FIELD

The present invention relates to a temperature-controlled container comprising an ultraviolet light source used to aid cleaning. The present invention also extends to an aircraft galley comprising one or more of said temperature-controlled containers.

BACKGROUND

Temperature-controlled container such as ovens and refrigerators are used on aircraft for storing and preparing food for passengers during flight. During use, contaminants can build-up within the temperature-controlled containers meaning that regular cleaning is required.

Cleaning typically takes place when the aircraft is on the ground between flights, and it can be a time-consuming process. There is therefore a need to reduce the time taken to clean the components of an aircraft galley to reduce the time the aircraft is out of operation, or reduce the turn-around-time of an aircraft between flights.

JP2009019839 describes an oven comprising a light irradiating means and light detecting means both positioned behind a transparent plate within the oven cavity. Ultraviolet light generated by the light irradiating means is absorbed by dirt accumulating within the oven causing it to fluoresce, which is then detected by the light detecting means to provide an indication of oven cleanliness. A problem identified with this arrangement is that over time dirt will accumulate on the transparent plates covering both the light irradiating and detecting means, which significantly reduces their effectiveness.

SUMMARY

Viewed from a first aspect, there is provided a temperature-controlled container for a food product comprising: a temperature regulation system; a temperature-controlled cavity for receiving a food product, wherein the temperature regulation system is configured to control a temperature within the cavity; a thermally-insulated door configured to thermally seal the temperature-controlled cavity when the door is in a closed configuration; and an ultraviolet (UV) light source mounted outside the temperature-controlled cavity and insulated from the temperature-controlled cavity by the thermally insulated door when the door is in the closed configuration; wherein the UV light source is arranged to emit a UV light beam configured to highlight the presence of contaminants within the thermally-insulated cavity when the thermally insulated door is an open configuration.

The container may comprise a door frame configured to house the thermally insulated door in the closed configuration, wherein the UV light source may be mounted in a recess within a surface of the door frame.

The UV light source may be mounted within a recess in an underside surface of an upper portion of the door frame.

The UV light source may be arranged so that the UV light beam is unobstructed between the UV light source and the temperature-controlled cavity when the thermally insulated door is in the open configuration.

The UV light beam may not configured to provide decontamination of the temperature-controlled cavity.

The temperature-controlled container may be an oven.

The temperature-controlled container may be a refrigerator or freezer.

The temperature-controlled container may be configured for installation in an aircraft galley.

The UV light source may be wireless controllable.

Viewed form a second aspect, there is provided an aircraft galley comprising one or more temperature-controlled containers as described in the first aspect above.

The aircraft galley may comprise a control panel configured to control the operation of the UV light source in each of the one or more temperature-controlled containers.

BRIEF DESCRIPTION OF THE DRAWINGS

Certain preferred embodiments of the present invention will now be described, by way of example only, with reference to the following drawings, in which.

DETAILED DESCRIPTION

Figure 1:
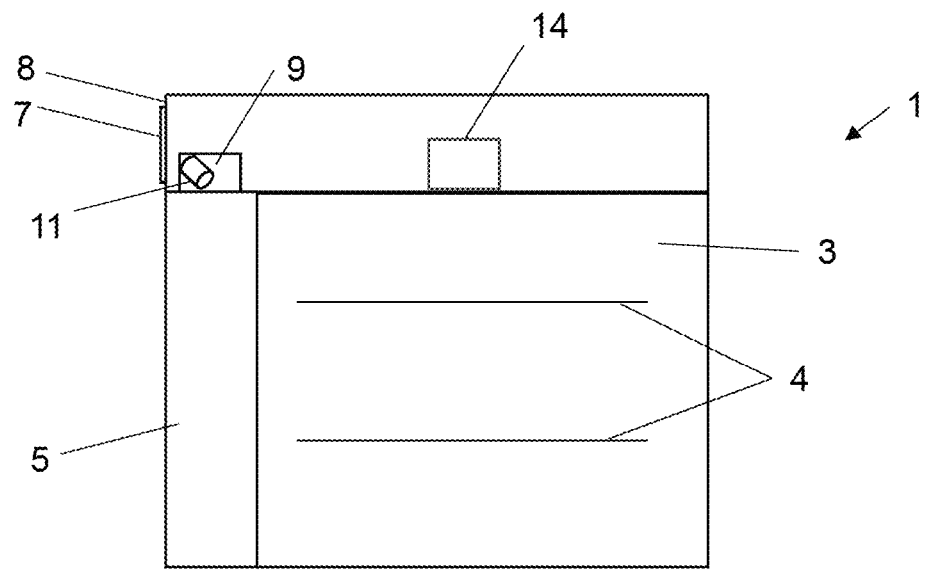
FIG. 1 depicts a side-view of a temperature-controlled container comprising an ultraviolet light.
Figure 2:
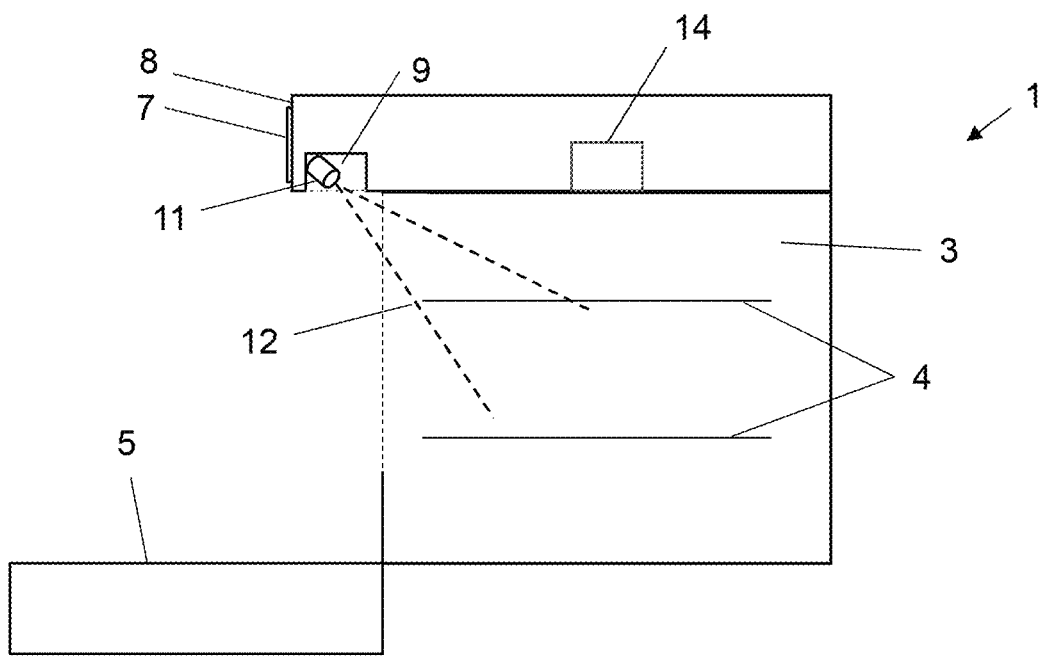
FIG. 2 depicts a side-view of a temperature-controlled container comprising an ultraviolet light.

FIGS. 1 and 2 show a side view of a temperature-controlled container 1 used for food products. In this example, the temperature-controlled container is an oven. The oven depicted in FIG. 1 may be a conventional oven used in any environment, but in a preferred example the oven forms part of an aircraft galley for preparation of food during flight.

The oven 1 comprises an internal cavity 3, which may be a cavity for heating food products. The temperature within the internal cavity 3 is controlled by a temperature regulation system 14. The internal cavity 3 comprises one or more shelves 4, in this case the cavity 3 comprises two shelves 4 spaced vertically apart. Walls surrounding the internal cavity 3 are thermally insulated.

The oven 1 comprises a thermally insulated door 5, wherein the door 5 is configured to move between a closed configuration (FIG. 1) and an open configuration (FIG. 2). In the closed configuration, the door 5 closes the cavity 3 to allow heat to build-up within the internal cavity 4. The oven 1 comprises a control panel 7 located on a front panel 8 of the oven 1 for adjusting a target temperature of the internal cavity 4, and other general settings of the oven 1.

The oven 1 may be a microwave oven, a conventional electric oven or fan-assisted oven.

During a flight, airline companies operating aircraft typically provide hot meals and the oven 1 can be used to heat said meals, if necessary. Over time, and after many uses of the oven 1, food products may be deposited on the surface of the internal cavity 3 and/or the shelves 4. The deposited food products will spoil and decompose over time leading to contaminants building up inside the oven cavity 3. Typical contaminants include bacteria, mold and fungus. The presence of contaminants has a negative effect on future food preparation and can lead to food poisoning and poor general hygiene.

To prevent the build-up of contaminants in the internal cavity 3 it is necessary to clean the internal cavity 3 and shelves 4 on a regular basis. This is typically carried out at regular intervals, for example, every 5 to 10 flight cycles. However, due to the number of temperature-controlled containers present on a typical aircraft this can be a time-consuming process that reduces the operating efficiency of the aircraft as the turnaround-time is increased. Moreover, it is not always readily apparent whether the internal cavity 3 requires cleaning and/or has been sufficiently cleaned from a visual inspection alone.

The oven 1 depicted in FIG. 1 includes an ultraviolet (UV) light source 11. In this exemplary embodiment the UV light source is housed within a recess 9 located in a door frame for housing the door 5 in the closed configuration. As such, the UV light source 11 is not located within the internal cavity 3 of the oven 1. It is instead positioned in the section between the front surface 8 of the front panel and the internal cavity 3 where the door 5 is located when the oven is closed as depicted in FIG. 1. The UV light source 11 may be located on an underside of the front panel 8 which may form an overhanging portion of the door frame.

This arrangement is beneficial in that the UV light source 11 is insulated by at least a portion of the door 5 from the temperature of the internal cavity 3. This improves the lifetime of the UV light source without needing to provide additional insulating material. The UV light source 11 is positioned in the recess 9 and directed towards the internal cavity 3.

When the oven 1 is cleaned, the door 5 is moved to the opened configuration as shown in FIG. 2. In the oven 1 depicted in FIGS. 1 and 2, the door 5 comprises a bottom hinge and is arranged to fold downwards, however, it will be appreciated that the door 5 may comprise a side or top hinge and fold sideways or upwards depending on the specific space requirements or oven type. For example, in the case where the oven 1 forms part of an aircraft galley, the over door 1 may comprise a side hinge and fold sideways as is common place for aircraft ovens. However, it will be appreciated that the arrangement of the door hinge does not affect the operation of the UV light source 11.

The UV light source 11 is activated which emits a UV light beam 12 into the internal cavity 3 of the oven 1. The UV light source 11 is therefore positioned in the recess 9 so that the UV light beam 12 is emitted into the internal cavity 3 of the oven 1.

The UV light source 11 may be activated by a button on the control panel 7, or it may be activated wirelessly using a portable device, such as a personal electronic device (PED), that the cleaning crew carry. In another example, the UV light source 11 may be activated, either by wired or wireless connection, by a central control panel located within an aircraft galley.

In the case where there are multiple temperature-controlled containers comprising a UV light source 11 within the aircraft galley, the central control panel may be configured to activate all of the UV light sources 11 simultaneously. Alternatively, the central control panel may be configured to control of the UV light sources individually, or in groups.

When the UV light source 11 is activated, the UV light beam 12 is absorbed by any contaminants present within the internal cavity 3 causing them to fluoresce. In addition, the cleaning crew may be provided with dedicated glasses to improve the visibility of any contaminants in the presence of the UV light beam 12. This effectively highlights any contaminants present within the internal cavity 3, which enables the cleaner to more effectively clean the internal cavity 3 as it will be clear where the contaminants are located, and when they have been removed. Furthermore, without the use of the UV light beam 12, an oven may appear clean from a visual inspection, but still comprise several contaminants not visible to the naked eye. The use of the UV light source 11 therefore results in improved cleaning of the oven 1 so that it is almost entirely clean of contaminants.

In addition, if the UV light source 11 is activated and the UV beam 12 does not highlight any contaminants within the internal cavity, the cleaner does need to clean the oven, and can move on directly to the next temperature-controlled container. This avoids the cleaner having to unnecessarily clean an oven 1 which is already sufficient clean of contaminants, thus improving the efficiency of their work and reducing the turnaround time of the aircraft. Moreover, the provision of the UV light source 11 within a recess 9 prevents the UV light beam 12 being mistakenly directed towards the cleaner's eyes.

As a further benefit, once the cleaning of the aircraft galley is completed by the cleaning crew, a supervisor will typically inspect the surface and internal cavities. If no UV light source 11 is present, it is not entirely clear whether or not the oven is free of contaminants. However, in the present example, the supervisor will be able to activate the UV light sources 11 for each oven 1, and immediately see whether or not the internal cavity 3 is sufficiently clean.

The UV light source 11, and UV light beam 12, themselves are not used for decontamination of the internal cavity 3. They are instead only used to highlight the presence and location of contaminants within the internal cavity 3 to aid a visual inspection of the internal cavity 3.

The internal cavity 3 may be considered a temperature-controlled cavity 3. In the case of the temperature-controlled container 1 being an oven 1, as described above, the temperature-controlled cavity 3 may be configured to provide a temperature in the range of between 50° C. and 300° C. Whereas in the alternative case of the temperature-controlled container 1 being a refrigerator the temperature-controlled cavity 3 may be configured to provide temperature in the range of between 0° C. and 8° C. In the further alternative case of the temperature-controlled container 1 being a freezer the temperature-controlled cavity 3 may be configured to provide temperature in the range of −15° C. and −25° C.

The above arrangement offers numerous benefits as already discussed, such as improving both the efficiency and effectiveness of the cleaning operation for aircraft galley components. In addition, it decreases the time taken to check the cleanliness of said galley components. These benefits result in a shorter turnaround time, or time which the aircraft is out of operation, resulting in an improved operating efficiency of the aircraft as whole. Moreover, the use of the UV light source 11 means that the cleanliness of the internal cavity 3 is greatly improved as it will allow the cleaner and supervisor to more easily ensure that the internal cavity 3 is substantially free of all contaminants.

The position of the UV light source 11 within the recess 9 on the underside of the front panel 7 means that the UV light source 11 is thermally insulated from the temperature of the internal cavity 3 by the door 5 when the door is in the closed configuration. Moreover, the UV light source 11 is protected from any contamination. As a further benefit, by locating the UV light source within the recess 9, the UV light source 11 does not extend outside the footprint of the existing oven. This is particularly advantageous for containers forming part of an aircraft galley where there are strict space requirements.

When the door 5 is in the opened configuration depicted in FIG. 2, there may be no components between the UV light source 11 and the internal cavity 3. This means that the UV light beam 12 is substantially unobstructed. While the internal surface of the door 5 may become obscured with contaminants, this does not affect the UV light beam 12 in this arrangement as the door is moved into the open configuration during cleaning.

The above example comprises a single UV light source 11, but it will be appreciated that multiple UV light sources 11 may be provided to improve the coverage of the UV light beam 12.

The invention claimed is:

1. A temperature-controlled container for a food product comprising:
   a temperature regulation system;
   a temperature-controlled cavity for receiving a food product, wherein the temperature regulation system is configured to control a temperature within the cavity;
   a thermally-insulated door configured to thermally seal the temperature-controlled cavity when the door is in a closed configuration; and
   an ultraviolet (UV) light source mounted outside the temperature-controlled cavity and insulated from the temperature-controlled cavity by the thermally insulated door when the door is in the closed configuration;
   wherein the UV light source is arranged to emit a UV light beam configured to highlight the presence of contaminants within the thermally-insulated cavity when the thermally insulated door is an open configuration.

2. The temperature-controlled container of claim 1, comprising a door frame configured to house the thermally insulated door in the closed configuration, wherein the UV light source is mounted in a recess within a surface of the door frame.

3. The temperature-controlled container of claim 2, wherein the UV light source is mounted within a recess in an underside surface of an upper portion of the door frame.

4. The temperature-controlled container of claim 1, wherein the UV light source is arranged so that the UV light beam is unobstructed between the UV light source and the temperature-controlled cavity when the thermally insulated door is in the open configuration.

5. The temperature-controlled container of claim 1, wherein the UV light beam is not configured to provide decontamination of the temperature-controlled cavity.

6. The temperature-controlled container of claim 1, wherein the temperature-controlled container is an oven.

7. The temperature-controlled container of claim 1, wherein the temperature-controlled container is a refrigerator or freezer.

8. The temperature-controlled container of claim 1, wherein the temperature-controlled container is configured for installation in an aircraft galley.

9. The temperature-controlled container of claim 1, wherein the UV light source is wireless controllable.

10. An aircraft galley comprising one or more temperature-controlled containers according to claim 1.

11. The aircraft galley of claim 10, comprising a control panel configured to control the operation of the UV light source in each of the one or more temperature-controlled containers.

* * * * *